United States Patent [19]

Chen et al.

[11] Patent Number: 5,461,618
[45] Date of Patent: Oct. 24, 1995

[54] ADAPTER FOR TRANSMISSION LINES USING HDLC FRAMES

[75] Inventors: Chi-Chang Chen, Taichung; Shian-Ming Tzeng, Yangmei; Chen-Chi Fan, Pan-Chiao, all of Taiwan

[73] Assignee: Industrial Technology Research Institute, Hsinchu, Taiwan

[21] Appl. No.: 906,612

[22] Filed: Jun. 30, 1992

[51] Int. Cl.$^6$ .................. H04J 3/22; H04L 12/20
[52] U.S. Cl. .................. 370/82; 370/84; 370/94.1; 370/110.1
[58] Field of Search .............. 370/84, 112, 95.1, 370/95.3, 82, 94.1, 94.2, 110.1, 79, 60, 60.1, 108; 375/7, 8, 38

[56] References Cited

U.S. PATENT DOCUMENTS

| | | | |
|---|---|---|---|
| 4,797,904 | 1/1989 | Dekker et al. | 370/24 |
| 4,805,167 | 2/1989 | Leslie et al. | 370/84 |
| 4,935,923 | 6/1990 | Shimizu et al. | 370/110.1 |
| 4,953,180 | 8/1990 | Fieschi et al. | 375/7 |
| 4,970,723 | 11/1990 | Lin | 370/110.1 |
| 5,210,745 | 5/1993 | Guinand et al. | 370/84 |
| 5,260,940 | 11/1993 | Urbansky | 370/84 |

OTHER PUBLICATIONS

William Stallings, "ISDN An Introduction", ch. 8–5 (1989).

*Primary Examiner*—Wellington Chin
*Attorney, Agent, or Firm*—Meltzer, Lippe, Goldstein, et al.

[57] ABSTRACT

An adapter for connecting a first low bit rate transmission link and a second high bit rate transmission link is disclosed. The adapter receives frames transmitted via the first link. The frames are of variable length and include a flag, an address field, a control field, a variable length data field and a frame check sequence. Each frame also includes after the flag a length code indicative of the frame length, which length code does not alter a frame check sequence of the frame. The adapter includes a processor which determines for each frame in response to the length code a specific time at which the adapter begins transmitting the frame out onto the second transmission link. The specific time is chosen for each frame so that the completion of the transmitting of the frame out on the second link substantially coincides with the completion of the receiving of the frame from the first transmission link. The length code of each frame is removed when it is transmitted out over the second transmission link. The inventive adapter is especially useful is certain kinds of ISDN networks. For example, a fractional terminal equipment (F-TE) may generate the frames with the length codes and transmit these frames in a sub-B channel which runs on an ISDN S/T interface bus at a rate of 64/N kbps, where N is an integer greater than two. The adapter forms part of a fractional network terminator (F-NT) which adapts the frames for transmission on a 64 kbps link, for example, to a central office.

13 Claims, 11 Drawing Sheets

HDLC-LIKE FRAME STRUCTURE

FIG. 6A  CODING TABLE FOR LENGTH 0 TO 49

| DATA | PATTERN | DECIMAL VALUE OF FIRST BYTE | REPRESENT LENGTH | NOTE |
|---|---|---|---|---|
| 00000000 | 0110010100111111 | 0 | | FIVE '1's |
| 00000001 | 0111010100011110 | 1 | 1 | |
| 00000010 | 0100010101111101 | 2 | | FIVE '1's |
| 00000011 | 0101010101011100 | 3 | 3 | |
| 00000100 | 0010010110111011 | 4 | 4 | |
| 00000101 | 0011010110011010 | 5 | 5 | |
| 00000110 | 0000010111111001 | 6 | | FIVE '1's |
| 00000111 | 0001010111011000 | 7 | 7 | |
| 00001000 | 1110010000110111 | 8 | 8 | |
| 00001001 | 1111010000010110 | 9 | | FIVE '1's |
| 00001010 | 1100010001110101 | 10 | 10 | |
| 00001011 | 1101010001010100 | 11 | 11 | |
| 00001100 | 1010010010110011 | 12 | 12 | |
| 00001101 | 1011010010010010 | 13 | 13 | |
| 00001110 | 1000010011110001 | 14 | 14 | |
| 00001111 | 1001010011010000 | 15 | | FIVE '1's |
| 00010000 | 0111011100001110 | 16 | 16 | |
| 00010001 | 0110011100101111 | 17 | 17 | |
| 00010010 | 0101011101001100 | 18 | 18 | |
| 00010011 | 0100011101101101 | 19 | 19 | |
| 00010100 | 0011011110001010 | 20 | 20 | |
| 00010101 | 0010011110101011 | 21 | 21 | |
| 00010110 | 0001011111001000 | 22 | | FIVE '1's |
| 00010111 | 0000011111101001 | 23 | | FIVE '1's |
| 00011000 | 1111011000000110 | 24 | 24 | |
| 00011001 | 1110011000100111 | 25 | 25 | |
| 00011010 | 1101011001000100 | 26 | 26 | |
| 00011011 | 1100011001100101 | 27 | 27 | |
| 00011100 | 1011011010000010 | 28 | 28 | |
| 00011101 | 1010011010100011 | 29 | 29 | |
| 00011110 | 1001011011000000 | 30 | 30 | |
| 00011111 | 1000011011100001 | 31 | | FIVE '1's |
| 00100000 | 0100000101011101 | 32 | 32 | |
| 00100001 | 0101000101111100 | 33 | | FIVE '1's |
| 00100010 | 0110000100011111 | 34 | 34 | |
| 00100011 | 0111000100111110 | 35 | | FIVE '1's |
| 00100100 | 0000000111011001 | 36 | 36 | |
| 00100101 | 0001000111111000 | 37 | | FIVE '1's |
| 00100110 | 0010000110011011 | 38 | 38 | |
| 00100111 | 0011000110111010 | 39 | 39 | |
| 00101000 | 1100000001010101 | 40 | 40 | |
| 00101001 | 1101000001110100 | 41 | 41 | |
| 00101010 | 1110000000010111 | 42 | 42 | |
| 00101011 | 1111000000110110 | 43 | | FIVE '1's |
| 00101100 | 1000000011010001 | 44 | 44 | |
| 00101101 | 1001000011110000 | 45 | 45 | |
| 00101110 | 1010000010010011 | 46 | 46 | |
| 00101111 | 1011000010110010 | 47 | | FIVE '1's |
| 00110000 | 0101001101101100 | 48 | 48 | |
| 00110001 | 0100001101001101 | 49 | 49 | |

FIG. 6B  CODING TABLE FOR LENGTH 50 TO 99

| DATA | PATTERN | DECIMAL VALUE OF FIRST BYTE | REPRESENT LENGTH | NOTE |
|---|---|---|---|---|
| 00110010 | 0111001100101110 | 50 | 50 | |
| 00110011 | 0110001100001111 | 51 | 51 | |
| 00110100 | 0001001111101000 | 52 | | FIVE '1's |
| 00110101 | 0000001111001001 | 53 | 53 | |
| 00110110 | 0011001110101010 | 54 | 54 | |
| 00110111 | 0010001110001011 | 55 | | |
| 00111000 | 1101001001100100 | 56 | 56 | |
| 00111001 | 1100001001000101 | 57 | 57 | |
| 00111010 | 1111001000100110 | 58 | 58 | |
| 00111011 | 1110001000000111 | 59 | | FIVE '1's |
| 00111100 | 1001001011100000 | 60 | 60 | |
| 00111101 | 1000001011000001 | 61 | 61 | |
| 00111110 | 1011001010100010 | 62 | | FIVE '1's |
| 00111111 | 1010001010000011 | 63 | | FIVE '1's |
| 01000000 | 0010110111111011 | 64 | | FIVE '1's |
| 01000001 | 0011110111011010 | 65 | 65 | |
| 01000010 | 0000110110111001 | 66 | 66 | |
| 01000011 | 0001110110011000 | 67 | 67 | |
| 01000100 | 0110110101111111 | 68 | | FIVE '1's |
| 01000101 | 0111110101011110 | 69 | | FIVE '1's |
| 01000110 | 0100110100111101 | 70 | 70 | |
| 01000111 | 0101110100011100 | 71 | 71 | |
| 01001000 | 1010110011110011 | 72 | 72 | |
| 01001001 | 1011110011010010 | 73 | 73 | |
| 01001010 | 1000110010110001 | 74 | 74 | |
| 01001011 | 1001110010010000 | 75 | 75 | |
| 01001100 | 1110110001110111 | 76 | 76 | |
| 01001101 | 1111110001010110 | 77 | | FIVE '1's |
| 01001110 | 1100110000110101 | 78 | 78 | |
| 01001111 | 1101110000010100 | 79 | | FIVE '1's |
| 01010000 | 0011111111001010 | 80 | | FIVE '1's |
| 01010001 | 0010111111101011 | 81 | | FIVE '1's |
| 01010010 | 0001111110001000 | 82 | | FIVE '1's |
| 01010011 | 0000111110101001 | 83 | | FIVE '1's |
| 01010100 | 0111111101001110 | 84 | | FIVE '1's |
| 01010101 | 0110111101101111 | 85 | 85 | |
| 01010110 | 0101111100001100 | 86 | | FIVE '1's |
| 01010111 | 0100111100101101 | 87 | 87 | |
| 01011000 | 1011111011000010 | 88 | | FIVE '1's |
| 01011001 | 1010111011100011 | 89 | 89 | |
| 01011010 | 1001111010000000 | 90 | 90 | |
| 01011011 | 1000111010100001 | 91 | 91 | |
| 01011100 | 1111111001000110 | 92 | | FIVE '1's |
| 01011101 | 1110111001100111 | 93 | 93 | |
| 01011110 | 1101111000000100 | 94 | 94 | |
| 01011111 | 1100111000100101 | 95 | | FIVE '1's |
| 01100000 | 0000100110011001 | 96 | 96 | |
| 01100001 | 0001100110111000 | 97 | 97 | |
| 01100010 | 0010100111011011 | 98 | 98 | |
| 01100011 | 0011100111111010 | 99 | | FIVE '1's |

FIG. 6C CODING TABLE FOR LENGTH 100 TO 149

| DATA | PATTERN | DECIMAL VALUE OF FIRST BYTE | REPRESENT LENGTH | NOTE |
|---|---|---|---|---|
| 01100100 | 0100100100011101 | 100 | 100 | |
| 01100101 | 0101100100111100 | 101 | 101 | |
| 01100110 | 0110100101011111 | 102 | 102 | |
| 01100111 | 0111100101111110 | 103 | | FIVES '1's |
| 01101000 | 1000100010010001 | 104 | 104 | |
| 01101001 | 1001100010110000 | 105 | 105 | |
| 01101010 | 1010100011010011 | 106 | 106 | |
| 01101011 | 1011100011110010 | 107 | 107 | |
| 01101100 | 1100100000010101 | 108 | 108 | |
| 01101101 | 1101100000110100 | 109 | 109 | |
| 01101110 | 1110100001010111 | 110 | 110 | |
| 01101111 | 1111100001110110 | 111 | | FIVES '1's |
| 01110000 | 0001101110101000 | 112 | 112 | |
| 01110001 | 0000101110001001 | 113 | 113 | |
| 01110010 | 0011101111101010 | 114 | | FIVES '1's |
| 01110011 | 0010101111001011 | 115 | 115 | |
| 01110100 | 0101101100101100 | 116 | 116 | |
| 01110101 | 0100101100001101 | 117 | 117 | |
| 01110110 | 0111101101101110 | 118 | 118 | |
| 01110111 | 0110101101001111 | 119 | 119 | |
| 01111000 | 1001101010100000 | 120 | 120 | |
| 01111001 | 1000101010000001 | 121 | 121 | |
| 01111010 | 1011101011100010 | 122 | 122 | |
| 01111011 | 1010101011000011 | 123 | 123 | |
| 01111100 | 1101101000100100 | 124 | | FIVES '1's |
| 01111101 | 1100101000000101 | 125 | | FIVES '1's |
| 01111110 | 1111101001100110 | 126 | | FIVES '1's |
| 01111111 | 1110101001000111 | 127 | | FIVES '1's |
| 10000000 | 1111010010110111 | 128 | 128 | |
| 10000001 | 1110010010010110 | 129 | 129 | |
| 10000010 | 1101010011110101 | 130 | 130 | |
| 10000011 | 1100010011010100 | 131 | 131 | |
| 10000100 | 1011010000110011 | 132 | 132 | |
| 10000101 | 1010010000010010 | 133 | 133 | |
| 10000110 | 1001010001110001 | 134 | 134 | |
| 10000111 | 1000010001010000 | 135 | 135 | |
| 10001000 | 0111010110111111 | 136 | | FIVES '1's |
| 10001001 | 0110010110011110 | 137 | 137 | |
| 10001010 | 0101010111111101 | 138 | | FIVES '1's |
| 10001011 | 0100010111011100 | 139 | 139 | |
| 10001100 | 0011010100111011 | 140 | 140 | |
| 10001101 | 0010010100011010 | 141 | 141 | |
| 10001110 | 0001010101111001 | 142 | 142 | |
| 10001111 | 0000010101011000 | 143 | 143 | |
| 10010000 | 1110011010000110 | 144 | 144 | |
| 10010001 | 1111011010100111 | 145 | | FIVES '1's |
| 10010010 | 1100011011000100 | 146 | 146 | |
| 10010011 | 1101011011100101 | 147 | 147 | |
| 10010100 | 1010011000000010 | 148 | 148 | |
| 10010101 | 1011011000100011 | 149 | 149 | |

FIG. 6D CODING TABLE FOR LENGTH 150 TO 199

| DATA | PATTERN | DECIMAL VALUE OF FIRST BYTE | REPRESENT LENGTH | NOTE |
| --- | --- | --- | --- | --- |
| 10010110 | 1000011001000000 | 150 | 150 | |
| 10010111 | 1001011001100001 | 151 | 151 | |
| 10011000 | 0110011110001110 | 152 | 152 | |
| 10011001 | 0111011110101111 | 153 | 153 | |
| 10011010 | 0100011111001100 | 154 | | FIVE '1's |
| 10011011 | 0101011111101101 | 155 | | FIVE '1's |
| 10011100 | 0010011100001010 | 156 | 156 | |
| 10011101 | 0011011100101011 | 157 | 157 | |
| 10011110 | 0000011101001000 | 158 | 158 | |
| 10011111 | 0001011101101001 | 159 | | FIVE '1's |
| 10100000 | 1101000011010101 | 160 | 160 | |
| 10100001 | 1100000011110100 | 161 | 161 | |
| 10100010 | 1111000100010111 | 162 | 162 | |
| 10100011 | 1110000010110110 | 163 | | FIVE '1's |
| 10100100 | 1001000001010001 | 164 | 164 | |
| 10100101 | 1000000001110000 | 165 | 165 | |
| 10100110 | 1011000000010011 | 166 | 166 | |
| 10100111 | 1010000000110010 | 167 | 167 | |
| 10101000 | 0101000111011101 | 168 | 168 | |
| 10101001 | 0100000111111100 | 169 | | FIVE '1's |
| 10101010 | 0111000110011111 | 170 | 170 | |
| 10101011 | 0110000110111110 | 171 | | FIVE '1's |
| 10101100 | 0001000101011001 | 172 | 172 | |
| 10101101 | 0000000101111000 | 173 | 173 | |
| 10101110 | 0011000100011011 | 174 | 174 | |
| 10101111 | 0010000100111010 | 175 | 175 | |
| 10110000 | 1100001011100100 | 176 | 176 | |
| 10110001 | 1101001011000101 | 177 | 177 | |
| 10110010 | 1110001010100110 | 178 | 178 | |
| 10110011 | 1111001010000111 | 179 | | FIVE '1's |
| 10110100 | 1000001001100000 | 180 | 180 | |
| 10110101 | 1001001001000001 | 181 | 181 | |
| 10110110 | 1010001000100010 | 182 | 182 | |
| 10110111 | 1011001000000011 | 183 | 183 | |
| 10111000 | 0100001111101100 | 184 | | FIVE '1's |
| 10111001 | 0101001111001101 | 185 | 185 | |
| 10111010 | 0110001110101110 | 186 | 186 | |
| 10111011 | 0111001110001111 | 187 | 187 | |
| 10111100 | 0000001101101000 | 188 | 188 | |
| 10111101 | 0001001101001001 | 189 | 189 | |
| 10111110 | 0010001100101010 | 190 | | FIVE '1's |
| 10111111 | 0011001100001011 | 191 | | FIVE '1's |
| 11000000 | 1011110001110011 | 192 | 192 | |
| 11000001 | 1010110001010010 | 193 | 193 | |
| 11000010 | 1001110000110001 | 194 | 194 | |
| 11000011 | 1000110000010000 | 195 | 195 | |
| 11000100 | 1111110011110111 | 196 | | FIVE '1's |
| 11000101 | 1110110011010110 | 197 | 197 | |
| 11000110 | 1101110010110101 | 198 | 198 | |
| 11000111 | 1100110010010100 | 199 | | FIVE '1's |

FIG. 6E  CODING TABLE FOR LENGTH 200 TO 255

| DATA | PATTERN | DECIMAL VALUE OF FIRST BYTE | REPRESENT LENGTH | NOTE |
|---|---|---|---|---|
| 11001000 | 0011110101111011 | 200 | 200 | |
| 11001001 | 0010110101011010 | 201 | 201 | |
| 11001010 | 0001110100111001 | 202 | 202 | |
| 11001011 | 0000110100011000 | 203 | 203 | |
| 11001100 | 0111110111111111 | 204 | | FIVE '1's |
| 11001101 | 0110110111011110 | 205 | 205 | |
| 11001110 | 0101110110111101 | 206 | 206 | |
| 11001111 | 0100110110011100 | 207 | 207 | |
| 11010000 | 1010110010000010 | 208 | 208 | |
| 11010001 | 1011111001100011 | 209 | | FIVE '1's |
| 11010010 | 1000111000000000 | 210 | 210 | |
| 11010011 | 1001111000100001 | 211 | 211 | |
| 11010100 | 1110111011000110 | 212 | 212 | |
| 11010101 | 1111111011100111 | 213 | | FIVE '1's |
| 11010110 | 1100111010000100 | 214 | 214 | |
| 11010111 | 1101111010100101 | 215 | | FIVE '1's |
| 11011000 | 0010111101001010 | 216 | 216 | |
| 11011001 | 0011111101101011 | 217 | | FIVE '1's |
| 11011010 | 0000111100001000 | 218 | 218 | |
| 11011011 | 0001111100101001 | 219 | | FIVE '1's |
| 11011100 | 0110111111001110 | 220 | | FIVE '1's |
| 11011101 | 0111111111101111 | 221 | | FIVE '1's |
| 11011110 | 0100111110001100 | 222 | | FIVE '1's |
| 11011111 | 0101111110101101 | 223 | | FIVE '1's |
| 11100000 | 1001100000010001 | 224 | 224 | |
| 11100001 | 1000100000110000 | 225 | 225 | |
| 11100010 | 1011100001010011 | 226 | 226 | |
| 11100011 | 1010100001110010 | 227 | 227 | |
| 11100100 | 1101100100010101 | 228 | 228 | |
| 11100101 | 1100100010110100 | 229 | 229 | |
| 11100110 | 1111100011010111 | 230 | | FIVE '1's |
| 11100111 | 1110100011110110 | 231 | | FIVE '1's |
| 11101000 | 0001100100011001 | 232 | 232 | |
| 11101001 | 0000100100111000 | 233 | 233 | |
| 11101010 | 0011100101011011 | 234 | 234 | |
| 11101011 | 0010100101111010 | 235 | 235 | |
| 11101100 | 0101100110011101 | 236 | 236 | |
| 11101101 | 0100100110111100 | 237 | 237 | |
| 11101110 | 0111100111011111 | 238 | 238 | |
| 11101111 | 0110100111111110 | 239 | | FIVE '1's |
| 11110000 | 1000101000100000 | 240 | 240 | |
| 11110001 | 1001101000000001 | 241 | 241 | |
| 11110010 | 1010101001100010 | 242 | 242 | |
| 11110011 | 1011101001000011 | 243 | 243 | |
| 11110100 | 1100101010100100 | 244 | 244 | |
| 11110101 | 1101101010000101 | 245 | 245 | |
| 11110110 | 1110101011100110 | 246 | 246 | |
| 11110111 | 1111101011000111 | 247 | | FIVE '1's |
| 11111000 | 0000101100101000 | 248 | | FIVE '1's |
| 11111001 | 0001101100001001 | 249 | | FIVE '1's |
| 11111010 | 0010101101101010 | 250 | | FIVE '1's |
| 11111011 | 0011101101001011 | 251 | | FIVE '1's |
| 11111100 | 0100101110101100 | 252 | | FIVE '1's |
| 11111101 | 0101101110001101 | 253 | | FIVE '1's |
| 11111110 | 0110101111101110 | 254 | | FIVE '1's |
| 11111111 | 0111101111001111 | 255 | | FIVE '1's |

ADAPTER FOR TRANSMISSION LINES USING HDLC FRAMES

RELATED APPLICATION

An application entitled "System for Providing Simultaneous Multiple Circuit-Switched Type Communications on an ISDN Basic Rate Interface" has been filed for Chi-Chang Chen, Bor-shen Wu, Jen-Yung Lin, and Min-Chang Lin on May 14, 1992 and bears Ser. No. 07/882,784, now U.S. Pat. No. 5,398,249. This application contains subject matter related to the subject matter of the present application and is incorporated herein by reference.

FIELD OF THE INVENTION

The present invention relates to an adapter for use in a telecommunications network. The adapter connects a first transmission line with a low bit rate and a second transmission line with a higher bit rate. Preferably both the first and second transmission lines use a High Level Data Link Control (HDLC) type protocol. The invention is especially useful in an ISDN network.

BACKGROUND OF THE INVENTION

The High Level Data Link Control protocol was developed by the International Standards Organization (ISO). The HDLC protocol is a data link control protocol used in various networks such as ISDN (Integrated Services Digital Network). The HDLC protocol uses synchronous transmission. All transmissions are in frames. A single frame format suffices for all types of data and control exchanges.

FIG. 1 illustrates a conventional HDLC frame. The frame has the following fields:

Flag (F)—8 bits

Address (A)—One or more octets (i.e., bytes)

Control (C)—8 or 16 bits

Data—Variable

Frame Check Sequence (FCS)—16 or 32 bits

Flag (F)—8 bits

The flag, address and control fields that precede the data field are known as a header. The FCS and flag fields following the data field are referred to as a trailer.

The flag fields delimit the frame at both ends with the unique pattern 01111110. A single flag may be used as the closing flag for one frame and the opening flag for the next. All active stations attached to a link are continuously hunting for the flag sequence to synchronize on the start of a frame. While receiving a frame, a station continues to hunt for that sequence to determine the end of the frame, as the frames are not of uniform length. However, because the HDLC frame allows arbitrary bit patterns, there is no assurance that the pattern 01111110 will not appear somewhere inside the frame, thus destroying frame-level synchronization. To avoid this problem, a procedure known as bit stuffing is used. The transmitter will always insert an extra 0 bit after each occurrence of five 1's in the frame (with the exception of the flag fields). After detecting a starting flag, the receiver monitors the bit stream. When a pattern of five 1's appears, the sixth bit is examined. If this bit is 0, it is deleted. If the sixth bit is a 1 and the seventh bit is a 0, the combination is accepted as a flag. If the sixth and seventh bits are both 1, the sending station is signaling an abort condition.

The frame check sequence is applied to the remaining bits of the frame, exclusive of flags. The normal FCS is the 16-bit CRC-CCITT standard. An optional 32-bit FCS, using CRC-32, may be employed if the frame length or line reliability dictates this choice. For purposes of illustration, only the 16-bit FCS is considered herein.

The purpose of each frame check sequence (FCS) is to allow the detection by the receiver of any errors that may have occurred during the transmission of a frame. The FCS consists of 16 bits of parity checking information that is computed at the sending side, prior to bit stuffing, from the bits contained in the address, control, and data fields, if present.

The computational procedure is derived from the well-known theory of cyclic codes. It proceeds as follows: Let the k binary bits contained in the address, control, and data fields of the frame by denoted by $$a_{k-1}, a_{k-2}, \ldots, a_1, a_0$$

and represented algebraically by the binary polynomial $$G(x)=a_{k-1}x^{k-1}+a_{k-2}x^{k-2}+\ldots+a_1x+a_0$$

where $a_{k-1}$ is the first bit following the opening flag. Also define an auxiliary polynomial $$L(x)=x^{15}+x^{14}+\ldots+x+1$$

and the generator polynomial $$P(x)=x^{16}+x^{12}+x^5+1$$

The polynomial P(x) has been standardized by the CCITT in Recommendation V.41 for use on general user-to-network interfaces.

Compute the remainder polynomial of the modulo-2 division of the polynomial $$x^{16}g(x)+x^kL(x)$$

by P(x) and denote this remainder by $$R(x)=r_{15}x^{15}+r_{14}x^{14}+\ldots+r_1x+r_0$$

The frame check sequence is the ones complement of the coefficients of R(x) and is represented by the polynomial $$FCS=R(x)+L(x)$$

The complete frame of n=k+16 bits exclusive of the beginning and ending flags then takes the form $$M(x)=x^{16}G(x)+(R(X)+L(X))$$

The division by the generator polynomial is performed on the data sequence that has been modified in two ways. First the multiplication of G(x) by the factor $x^{16}$ is equivalent to appending 16 zeroes to the sequence and creates the space for the FCS in the frame. Second, the addition of $x^kL(x)$ to $x^{16}G(x)$ corresponds to the inversion of the first 16 bits of the data sequence and provides protection against the obliteration of the opening flag.

During transmission, the message M(x) may incur errors through the deletion or addition of bits or a change in their logical value. The latter type of error can be represented by the addition of the polynomial $$E(x)=e_{n-1}x^{n-1}+e_{n-2}x^{n-2}+\ldots+e_1x+e_0$$

to the message, so that the received message is given by $$M_r(x)=M(x)+E(x)$$

The receiver calculates the remainder $R_r(x)$ obtained by dividing the polynomial $$x^{16}M_r(x)+x^nL(x)=x^{16}[x^{16}G(x)+x^kL(x)+R(x)]+x^{16}E(x)+x^{16}L(x)$$

by the generator polynomial $P(x)$.

Given the relationship between $G(x), R(x)$, and $L(x)$ imposed at the sending end, the term in square brackets is evenly divisible by $P(x)$. The desired remainder is therefore equal to the remainder that would be obtained from the division of $$x^{16}E(x)+x^{16}L(x)$$

by $P(x)$. This shows that $R_r(x)$ does not depend on the particular data sequence but is a function of the error pattern alone.

Now suppose that the message is received without errors of any kind. Then $E(x)=0$, and the preceding division results in the remainder $$R_r(x)=x^{12}+x^{11}+x^{10}+x^8+x^3+x^2+x^1+1$$

Any other value of $R_r(x)$ therefore indicates the presence of errors in the received message.

A circuit 10 for a shift register implementation of the FCS calculation at the transmitter and receiver is shown in FIG. 2. The circuit 10 comprises a shift register 13 formed from the storage elements 12 and gates 9.

The addition of $x^kL(x)$ to $x^{16}G(x)$ is accomplished by presetting the storage elements 12 of shift register 13 to binary 1. The register 13 calculates $R(x)$ by enabling gates G2 and G3 and disabling via invertor 16 gate G1 using the input A. The k coefficients of $G(x)$ arrive at the input 14 and are cycled through the register 13 via the feedback path through the gate 15 and the gate G3. At the same time the arriving data at the input 14 are shifted into the outgoing channel 25 via the gate G2 and gate 22. After k shifts, the register 13 contains the sixteen coefficients of $R(x)$, which are then shifted into the channel 25 by enabling gate G1 and disabling gates G2 and gate G3. The inversion of the coefficients takes place in the inverter 27.

The register at the receiver, which is almost identical to the one at the transmitter, is again preset to binary 1. The entire received message $M_r(x)$ is then shifted through the register by enabling gates G2 and G3 and disabling gate G1. If the message contained no errors, the content of the register after n shifts will be the pattern 0 0 0 1 1 1 0 1 0 0 0 0 1 1 1 1

Any other error pattern would, of course, indicate the presence of one or more errors in $M_r(x)$.

The address field and control field are not of particular relevance to the present invention and are not discussed in detail herein.

Some devices connect two lines of different rates. For example, a concentrator may be collect data from many low rate terminals and place this data on a high speed transmission link connecting a host. An adapter may transform a HDLC-based protocol to another HDLC-based protocol.

FIG. 3 illustrates a system 50 in which two transmission lines with different transmission rates are connected. An external device (not shown) transmits data to device D1 on line L0. The external device may be a conventional slow rate interface such as an RS-232. Device D1 is a transceiver which receives data on the line L0 and generates HDLC-like frames which are transmitted at a low rate on the line L1, which is a low bit rate line. Device D2 is an adapter or rate converter for adapting the HDLC-like frames on line L1 to appropriate HDLC-like frames which will be transmitted at a higher rate on the high bit rate line L2.

When there are data transmitted from high bit-rate line L2 to low bit-rate line L1, the adapter can transmit each data frame as soon as it is received. The data arrives much faster than it leaves. The transmitter of the adapter will not encounter underflow. The adapter D2 may have a problem of overflow which can be solved by enlarging the size of the receiving buffer. In the reverse procedure, if the data frames are transmitted from the low-rate line L1 to the high-rate line L2, the transmitter of the adapter will have the possibility of data underflow.

Store-and-forward is the simplest method to solve this rate adaption problem. In accordance with the store-and-forward technique, the adapter or concentrator starts transmitting a data frame on the high bit rate line L2 after it receives the complete data frame from the low bit rate line L1. It first stores the whole frame in a receiving buffer. Then, the data frame is transmitted out over the high bit rate line. Under such scheme, there will be no possibility of underflow. However, the store-and-forward method has a shortcoming of having a long delay before a frame is transmitted via the high bit rate line.

A further problem with the store-and-forward technique is that the adapter D2 requires an FCS circuit, which as shown in FIG. 2 comprises a shift register and associated logic. The adapter D2 also requires bit stuffing circuitry. These circuits add to the complexity and cost of the adapter.

The problem of rate adaption may be important in certain kinds of ISDN networks. ISDN is a general purpose digital network capable of supporting access to a wide range of interconnected services such as voice, data facsimile and video. ISDN achieves the support of a large variety of services by providing a standard digital user-network interface. A standard network-user interface 60 is illustrated in FIG. 4. A public network circuit 62 (e.g., a central office switch or PABX) is connected by a trunk line 63 to the fractional network termination unit (F-NT) 65. Illustratively, the trunk line 63 has a rate of 64 kbps. A plurality of terminal equipment 68 (TE's and F-TE's) are connected via S/T buses 67a, 67b to the network termination unit 65. Some of the terminal equipment is fractional (F-TE) and transmits at a rate of 64/N kbps where N is an integer greater than 2. The remainder of the terminal equipment (TE) is standard and transmits at 64 kbps. The physical frames transmitted on the S-bus from the terminal equipment to the network termination unit 65 comprise two B channels and one D channel (see, e.g., U.S. Pat. No. 4,920,723). Illustratively, the terminal equipment generates HDLC frames which are transmitted in a B or sub-B channel of the physical frames. Rate adaptation is necessary at the network termination unit 65 of FIG. 4 to convert between the 64/N kbps bit stream transmitted on bus 67b and the 64 kpbs bit stream on the line 63.

In view of the foregoing it is an object of the present invention to provide a rate adapter and rate adaptation technique which receives frames such as HDLC frames on a low bit rate line and retransmits the frames on a high bit rate line with a minimum of delay. More specifically, it is an object of the present invention to provide a rate adapter and rate adaptation technique which overcomes the shortcomings of the store-and-forward technique described above. It is a further object of the invention to provide an adapter and adaptation technique which requires neither an FCS circuit nor a bit stuffing circuit. It is also an object of the present invention to provide an adaptation technique for use at a fractional NT in an ISDN network.

SUMMARY OF THE INVENTION

In a preferred embodiment, the present invention provides a rate conversion adapter which connects a first low bit rate transmission line and a second high bit rate transmission line. The adapter receives frames transmitted via the low bit rate line and retransmits these frames out over the high bit rate line with a minimum of delay.

The frames are of variable length and include a flag, an address field, a control field, a variable length data field, and a frame check sequence. Each frame arriving at the adapter over the low bit rate line also includes a length code indicative of the frame length, which length code does not alter a frame check sequence of the frame. In other words, the length code is divisible by a generator polynomial of the frame check sequence. The length code may follow the opening flag of a frame. Illustratively, the frames arriving at the adapter are HDLC frames which have been modified in accordance with the present invention to include the length code.

The adapter includes a processor which determines for each frame in response to its length code a specific time at which the adapter begins transmitting the frame out onto the high bit rate transmission line. The specific time is chosen so that the completion of the transmitting of the frame out over the high bit rate line is substantially simultaneous with the completion of the receiving of the frame from the low bit rate line. This eliminates the delays associated with the conventional store-and forward technique. The length code is removed from each frame before it is retransmitted out over the high bit rate line.

The adapter according to the invention requires neither an FCS circuit nor a bit stuffing circuit.

The inventive adapter is especially useful in certain kinds of ISDN networks. For example, a fractional terminal equipment (F-TE) may generate the frames with the length codes and transmit the frames in a sub-B channel at a rate 64/N kbps. The adapter forms part of a fractional network terminator (F-NT) which receives the frames at 64/N kbps and retransmits the frames at 64 kbps.

BRIEF DESCRIPTION OF THE DRAWING

FIG. 2 illustrates a circuit for performing a frame check sequence calculation.

DETAILED DESCRIPTION OF THE INVENTION

Figure 1:
FIG. 1 illustrates a conventional HDLC-like frame.
Figure 3:
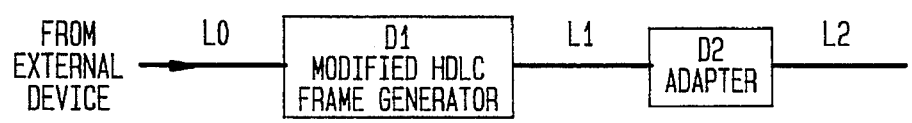
FIG. 3 schematically illustrates a system including a rate adapter.
Figure 4:
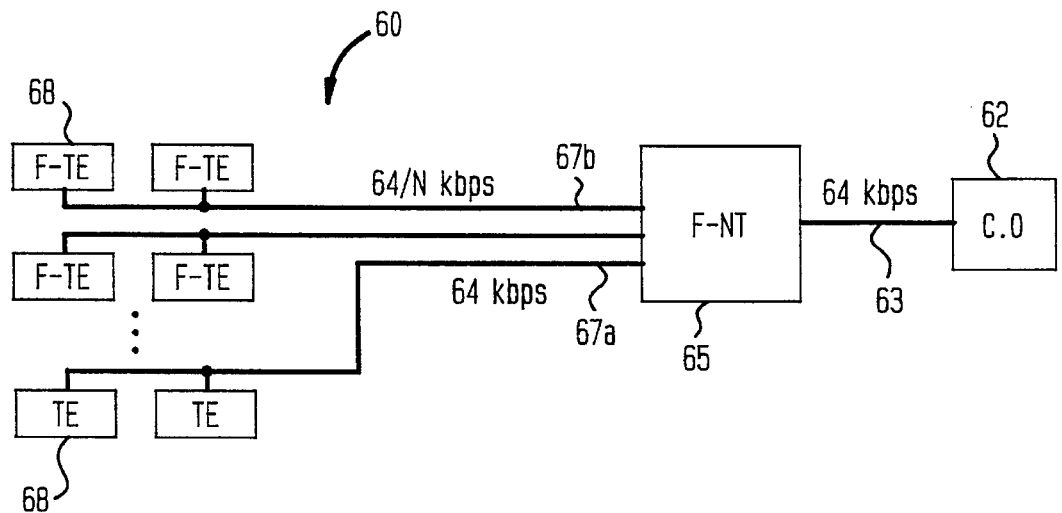
FIG. 4 schematically illustrates an ISDN network-user interface.
Figure 5:
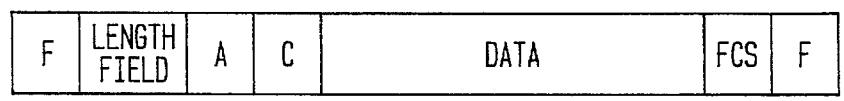
FIG. 5 illustrates a modified HDLC-like frame according to the invention.
Figure 6:
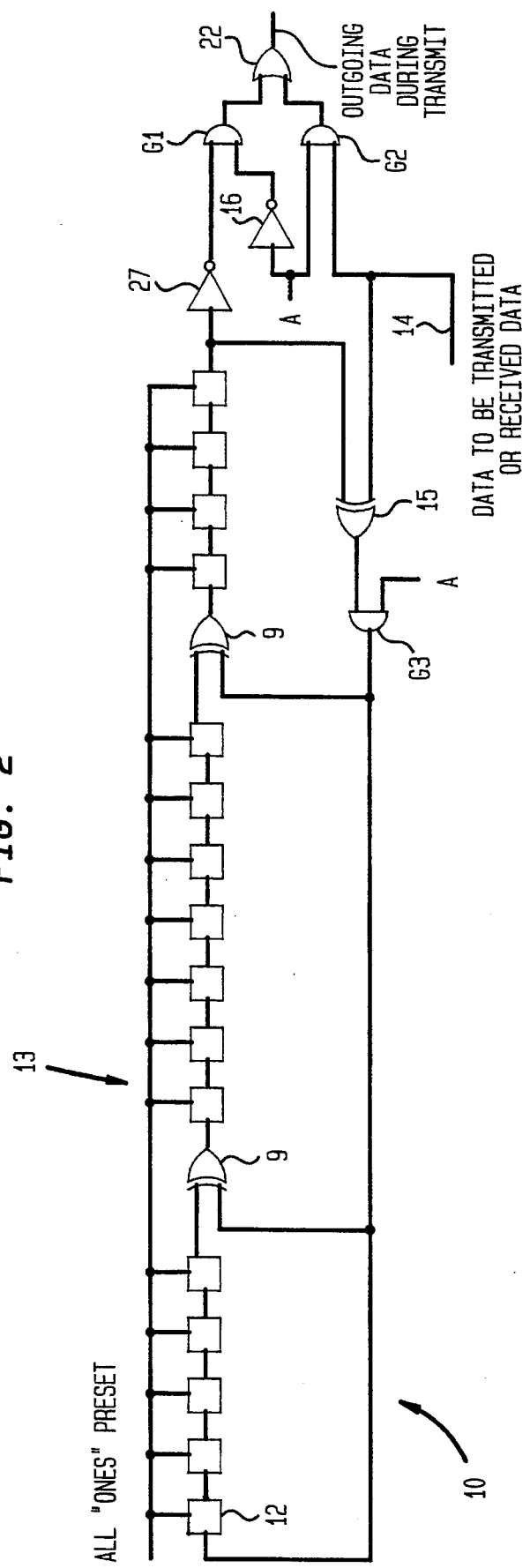
FIGS. 6A, 6B, 6C, 6D and 6E together show a length code table storing length codes for use in frames in accordance with the present invention.

In accordance with the present invention, the device D1 of FIG. 3 generates modified HDLC frames rather than conventional HDLC frames. The modified HDLC frames are transmitted on the low rate line L1, received at the adapter D2, and retransmitted on the high rate line L2 with minimum delay. The modified HDLC frames include a length field which contains a length code illustratively comprising three bytes. A modified HDLC frame is illustrated in FIG. 5. Note that the length field containing the length code immediately follows the opening flag. The length code indicates the data length in the data field of the modified HDLC frame and does not change the FCS of the original (i.e., unmodified) HDLC frame. This eliminates the FCS calculation circuit at the adapter D2 of FIG. 3. Furthermore, the length code avoids the bit stuffing procedure. This eliminates any need for a zero deletion and zero insertion circuit in the adapter D2 of FIG. 3.

The following describes the coding methodology utilized in connection with the length code.

Referring to FIG. 3, assume the following conditions:

(1) the L1 side transmission rate is $64/N (N=2,3,4, \ldots)$ kbps (2) the L2 side transmission rate is 64 kbps (3) M represents the total bytes of a frame sent by D1

(4) $M'=M-3$ represents the total bytes of the frame sent by D2, as the three byte length code is removed before the adapter sends out the frames.

In accordance with the invention, when D2 receives X bytes from D1, then D2 start transmission so that D2 and D1 will complete transmission substantially concurrently. The transmission performance will be good with minimum time delay. The variable X is determined by the following equation:

$$(M-(X+3))*8/(64/N \text{ kbps}) = (M-3)*8/(64 \text{ kbps}) \qquad \text{(EQU-1)}$$

Solving EQU-1 for X, there is obtained $$X = M*(N-1)/N + 3*(N-1)N \qquad \text{(EQU-2)}$$

So, as long as the adapter D2 knows the whole length of the frame sent by D1, from EQU-2, the adapter D2 can calculate the right time to send the frame out onto L2.

The coding methodology for the length code of the Modified HDLC frame is to keep the FCS value unchanged when the length code is deleted and to avoid the bit stuffing procedure.

Refer again to FIG. 2, the hardware implementation of the FCS circuit. At the beginning of a calculation, the shift register 13 is preset to all binary 1's. Then the bit stream from the address code is cycled through the shift register 13. If there is a data pattern which cycles through the register before the bit stream of the address field and which set the registers all to binary 1, then the presence of such a data pattern before the address field has no effect on the FCS value of the frame. The length codes used to modify the HDLC-like frames in accordance with the present invention have this property. Thus, the hardware circuity (see FIG. 2) required for FCS calculation is not changed by the addition of the length code to the frame. Because the register number (i.e. number of bit locations in the shift register 13) is sixteen, the length code data pattern must exceed sixteen bits. So a twenty-four bit pattern to represent the length code in the modified HDLC frame is selected. Viewed another way, it may be stated that the length code of a frame is divisible by a generator polynomial of the FCS.

Utilizing the foregoing and using software (C language) to model the FCS hardware in FIG. 2, there is obtained the coding table of FIGS. 6A, 6B, 6C, 6D and 6E. In the coding table, there is a total 256 three byte data patterns which can set the registers to binary 1, but only 180 data patterns which do not have five 1's continuous in the data pattern. Note the first byte in every data pattern is different and the numerical value is equal to 0 to 255. We use the first byte value to represent the data length of the frame. If a length code has five consecutive 1's, the next length code without five consecutive 1's is utilized. For example, if the data length is 22, because the length code for 22 had five consecutive 1's then there is used the length code corresponding to 24 to replace the length code corresponding to 22 to indicate the data length. This enlarges the original data length.

In the above-mentioned coding table, the maximum data length value of available length codes is 246. If there is a need to utilize data lengths greater than 246, the corresponding length code can be multiplied by 2 to indicate a data length greater than 246. However, with this method, the accuracy of the data length will be effected and the transmission performance will be decreased. Alternatively, in order to obtain better performance and accuracy, the length field may be increased to 32 bits (4 bytes). In this alternative approach, the same, foregoing methodology is utilized to obtain a new coding table.

The whole operation carried out by the system 50 of FIG. 3 according to the invention can be described as following:

* D1 receives data from L0 and decides the data length of a frame to send to D2
* D1 gets the length code from a coding table and puts the length code in the length field of a modified HDLC frame
* D1 sends the modified HDLC frame to D2 via L1
* D2 receives the modified HDLC frame and extracts the length code
* D2 calculates the X value using EQU-2 and discards the length code
* D2 continues to receive the modified HDLC frame via L1 and puts the arriving bit stream in a FIFO
* When D2 receives X bytes it starts to transmit data in the FIFO out onto L2
* The frames transmitted on L2 are HDLC-like because the length code contained in the modified frames has now been removed.

Figure 7:
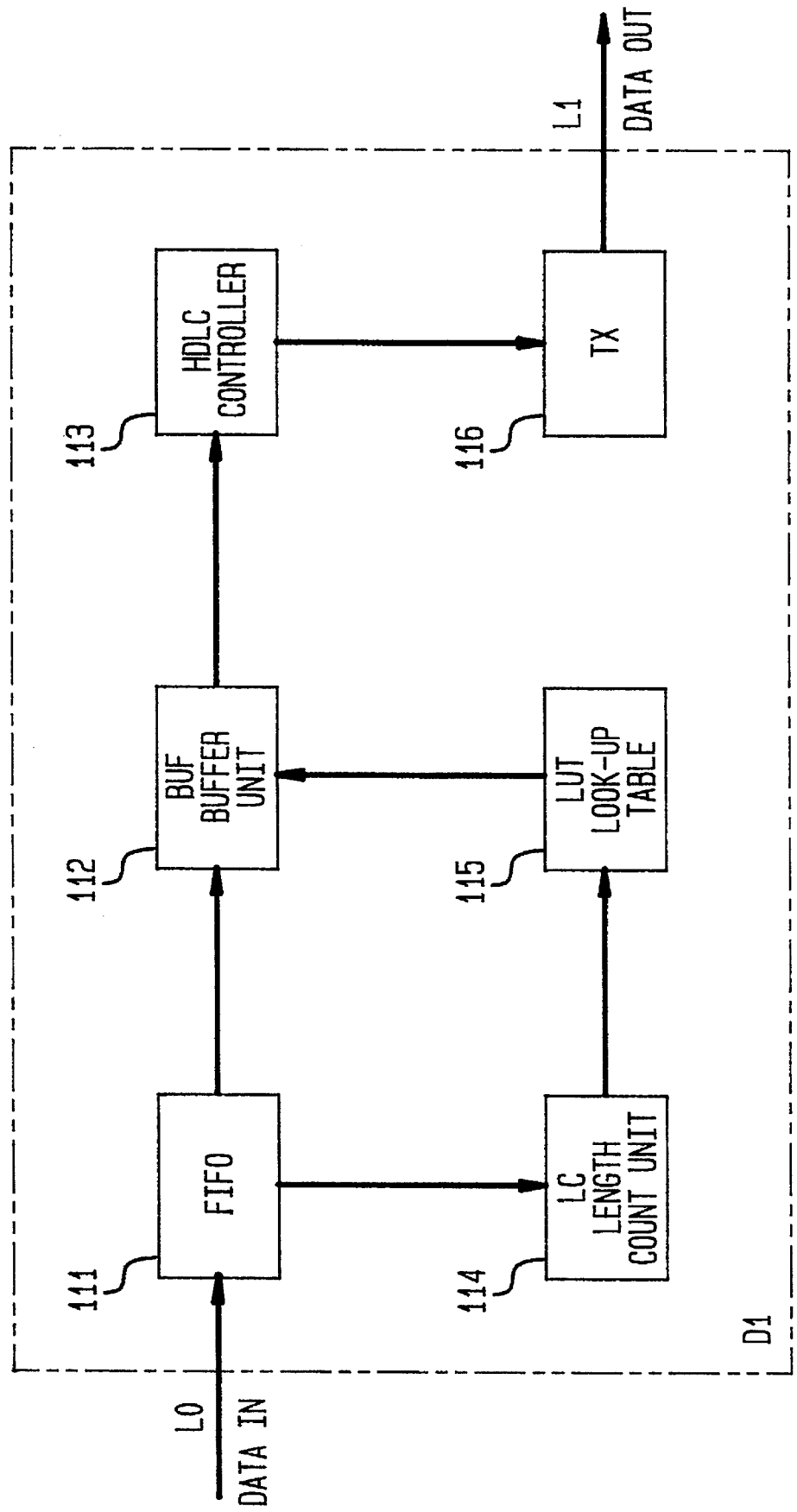
FIG. 7 illustrates a device for generating modified HDLC-like frames in accordance with the invention.

Referring now to FIG. 7, there is shown a block diagram of D1 for generating modified HDLC-like frames in accordance with the invention. The data come from L0 and are received by the First-In-First-Out buffer unit (FIFO) 111. The data length of the modified HDLC frame to be generated is determined by the Length Count unit (LC) 114. The Look-up Table (LUT) 115, which can be implemented with Read Only Memory (ROM), stores the coding table. The buffer unit (BUF) 112 inserts the length field ahead of the data in the frame. The HDLC controller 113 packs the length field and data field to form a HDLC frame. Then the transmitter (TX) 116 transmits the modified frame out on the low bit rate line L1.

Figure 8:
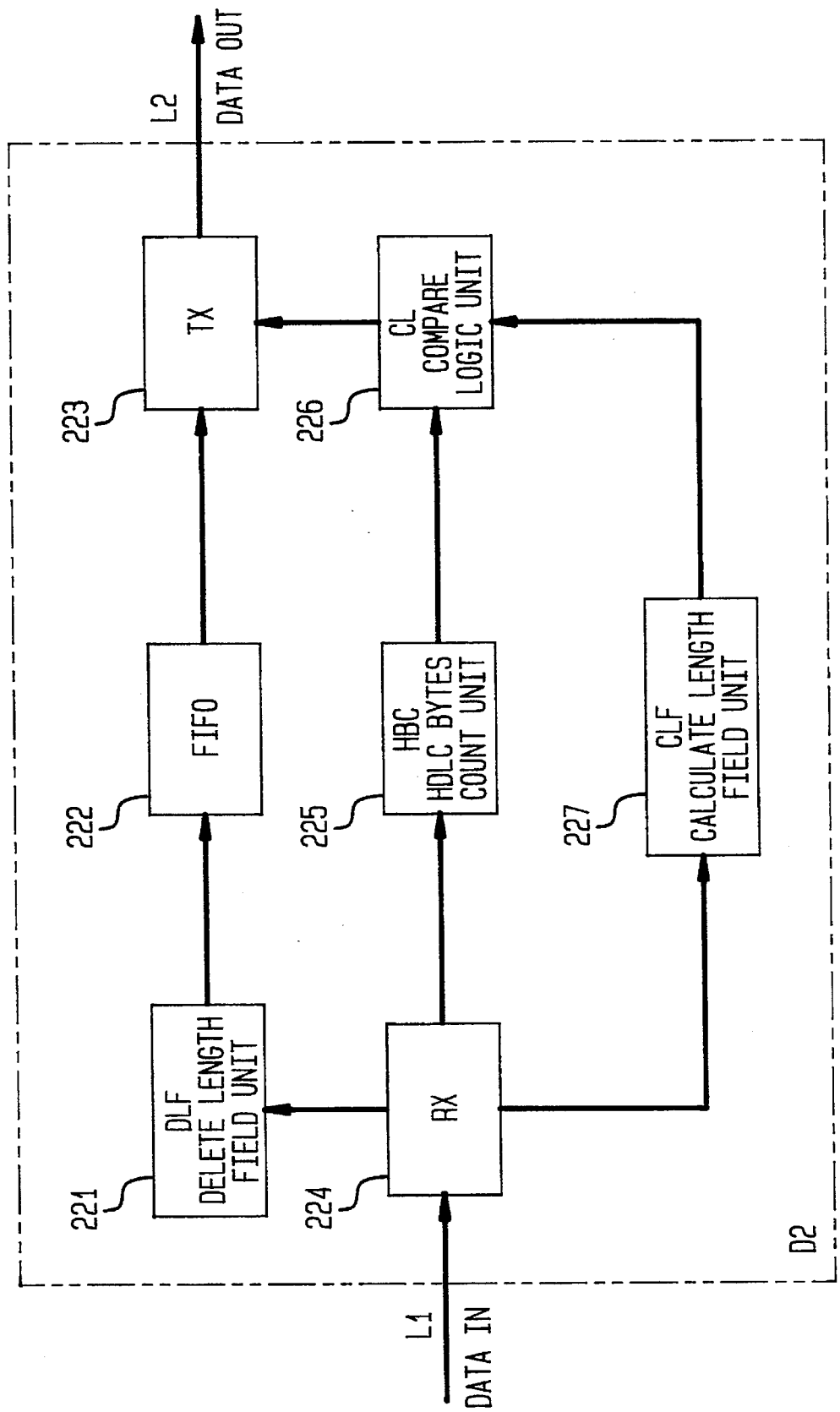
FIG. 8 illustrates an implementation of a rate adapter in accordance with the invention.

FIG. 8 is a block diagram of an adapter D2 in accordance with the invention. The modified HDLC frames are received by the receiver (RX) 224 from low bit rate line L1. The delete length field unit (DLF) 221 discards the length field of each modified HDLC frame and puts the other data in the First-In-First-Out buffer (FIFO) 222 in order including the flag field. The calculate length field unit (CLF) 227 gets the length field and calculates the X value using EQU-2. The HDLC bytes count unit (HBC) 225 counts how many bytes have been received in the modified HDLC frame. The compare logic unit (CL) 226 compares the X value with the byte count in the modified HDLC frame maintained by the counter 225. When the byte count value equals X, the CL 226 will indicate to the transmitter (TX) 223 to start the transmitting the data in FIFO 222 out onto the high bit rate L2. In this manner, reception of the frame via L1 and transmission of the frame onto L2 are completed at substantially the same time by the adapter D2 in accordance with a preferred embodiment of the invention.

Figure 9:
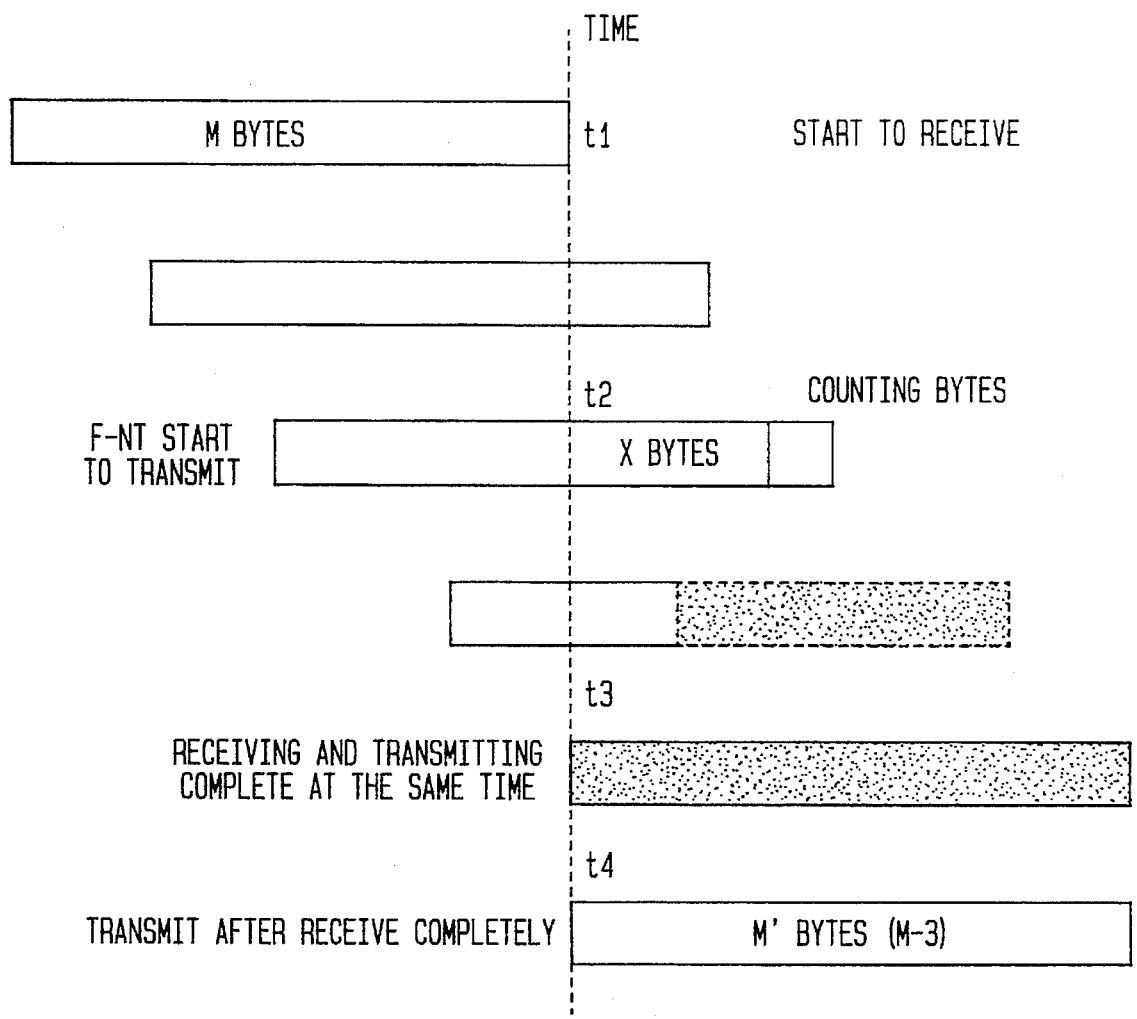
FIG. 9 is a timing diagram which shows how the adaptation technique of the present invention reduces delays.

FIG. 9 shows how the adapter of the present invention reduces or eliminates delays characteristic of the prior art store-and-forward technique. At time t1, a frame comprising M bytes is received at the adapter D2 via the low bit rate line L1. At time t2, when X bytes have been received at the adapter, the adapter begins to transmit out on the high bit rate line L1. At time t3, both receiving of the frame via L1 and transmission of the frame via L2 are completed by the adapter. It should be noted that the frame arrives at the adapter containing M bytes. However, because the length code is removed, the frame leaves the adapter with M'=M–3 bytes. On the other hand, using the prior art store-and-forward technique, transmission would not begin until after reception is complete so that transmission would not be complete until time t4.

Figure 10:
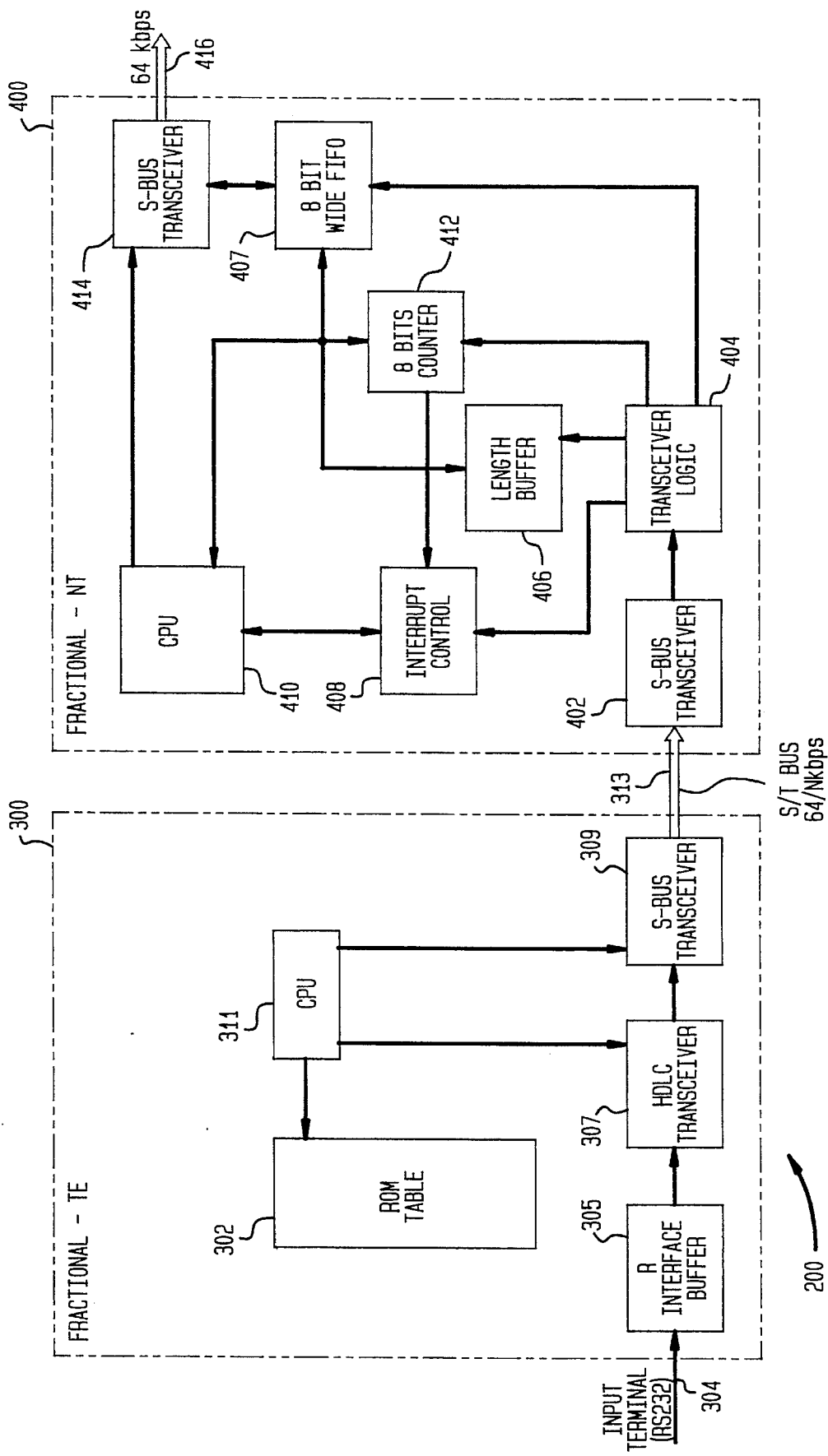
FIG. 10 illustrates a user interface of an ISDN network which incorporates a rate adapter in accordance with the present invention.

An alternative embodiment of the invention is illustrated in FIG. 10. The embodiment of the invention shown is applicable to an ISDN network. More specifically, FIG. 10 shows a user interface 200. The user 200 interface includes a fractional terminal equipment (F-TE) 300 and a fractional network terminator (F-NT) 400.

The F-TE 300 serves for generating modified HDLC frames in accordance with the invention. Thus, the F-TE 300 includes a ROM table 302 for storing a length code for each possible length of the modified HDLC frames. As discussed above, each length code is three bytes to insure that the length code does not alter the FCS value of a frame, but the actual length is indicated by the first byte of the three byte length code.

The F-TE 300 also includes the R-Interface buffer 305, the HDLC transceiver 307, and the S-bus transceiver 309. The ROM table 302, Interface buffer 305, HDLC transceiver 307 and S-bus transceiver 309 are controlled by the CPU 311.

Data is received at the F-TE 300 via the input terminal 304 at a slow rate from an RS 232 interface, for example. The data is stored in the interface buffer 305. The HDLC transceiver 307 organizes this data into modified HDLC frames including a three byte length code which is retrieved from the ROM table 302. As indicated above, it is the first byte of the length code which codes the length and the last two bytes which insure that the length code is divisible by the FCS generator polynomial. The S-bus transceiver 309 puts the modified HDLC frames in a sub-B channel of an ISDN frame for transmission over the bus 313 at a rate of 64/N (N≧2) kbps.

The frames are received at the F-NT 400 at the S-bus transceiver 402. The transceiver logic 404 removes the HDLC frames from the ISDN sub-B channel and places the first byte of the length code in the length buffer 406. The interrupt controller 408 interrupts the CPU 410 to read the length buffer 406 to determine M (i.e., number of bytes in the frame). The CPU then determines from EQU-2 when to start transmitting the frame, and puts the value X in the counter 412.

The second and third bytes of the length code of the HDLC-like frames are discarded and each byte of the arriving frame is written into the eight-bit-wide FIFO 407.

Each time a byte is written into the FIFO 407, the counter 412 discremented one count. In other words, each time a byte is received at the F-NT 400, the counter 412 is decremented one count. When the counter 412 reads zero, the S-bus transceiver 414 starts transmitting the frame from the FIFO 407 out onto the bus 416 at 64 kbps. As the length code has been discarded, the frame now has a conventional HDLC format.

It should be noted that in an illustrative embodiment of the invention the frames transmitted on the bus 416 satisfy the V.120 protocol. The frames on the bus 313 are modified to include the length code but otherwise conform to the V.120 protocol.

Finally, the above-described embodiments of the invention are intended to be illustrative only. Numerous alternative embodiments may be devised by those skilled in the art without departing from the spirit and scope of the following claims.

We claim:

1. An adapter for connecting a first transmission means which operates at a low transmission rate to a second transmission means which operates at a fast transmission rate comprising receiving means for receiving frames transmitted on the first transmission means, each frame transmitted on the first transmission means comprising a flag, an address field, a control field, a data field of variable length, and a frame check sequence, each frame further including a length code corresponding to its length, each frame having a frame check sequence which is unaltered by the addition of the length code to the frame, means for removing the length code from each frame, transmitting means for transmitting each frame on the second transmission means beginning at a specific time individually determined for each frame, and processing means for determining in response to the length code contained in each frame the specific time for said transmitting means to begin transmitting the frame, said specific time being chosen such that completion of the transmitting of the frame by said transmitting means substantially coincides with completion of the receiving of the frame by said receiving means.

2. The adapter of claim 1 wherein the length code of each frame is divisible by a generator polynomial of the frame check sequence.

3. The adapter of claim 2 wherein said adapter is part of an ISDN network.

4. The adapter of claim 3 wherein said adapter forms part of a fractional network terminator (F-NT) of said ISDN network.

5. The adapter of claim 4 wherein said adapter is connected via said first transmission means to a fractional terminal equipment (F-TE) of said ISDN network, said fractional terminal equipment generating said frames including said length code for transmission over said first transmission means.

6. The adapter of claim 1 wherein said adapter is connected via said first transmission means to a circuit for generating said frames comprising means for receiving data, means for storing a length code corresponding to each possible length of said frames, means for formatting said data into said frames of variable length including means for retrieving from said storing means the length code corresponding to the length of each frame and inserting the length code into the frame.

7. An adapter for connecting a low transmission rate link to a fast transmission rate link comprising means for receiving from the low transmission rate link frames of variable length including a length code and a frame check sequence, wherein the length code of each frame is divisible by a generator polynomial of the frame check sequence of the frame, means for transmitting each frame onto the fast transmission rate link after removing the length code, and processing means for determining in response to the length code in each frame a specific time at which the transmitting means begins transmitting the frame onto the fast link such that the completion of the transmitting of the frame onto the fast link substantially coincides with the completion of the receiving of the frame from the low rate link.

8. The adapter of claim 7 wherein said adapter is connected via the low rate link to a device for generating said frames, said device comprising memory means for storing a length code corresponding to each possible frame length, means for formatting data into frames of variable length including means for retrieving for each frame the corresponding frame length code from said memory means and inserting the corresponding frame length code into each frame, and means for transmitting the frame onto said low rate transmission link.

9. The adapter of claim 8 wherein said adapter is located in an ISDN network, and forms a fractional network termination (F-NT) unit of said ISDN network, said low rate transmission link is formed by an ISDN bus and wherein said frames are transmitted via said bus in a B channel of ISDN interface frames, and said device is a fractional terminal equipment (F-TE) of said ISDN network.

10. A method for interfacing first transmission means with a low transmission rate and a second transmission means with a high transmission rate comprising the steps of generating frames of variable length, each frame including a length code indicative of the length of the frame which does not alter a frame check sequence value of the frame, transmitting the frames via the first transmission means to an adapter, receiving each frame transmitted via the first transmission means at said adapter, and after removing the length code, transmitting each frame onto the second transmission means beginning at a specific time such that the transmitting of the frame onto the second transmission means is complete at substantially the same time as the receiving of the frame via the first transmission means is complete.

11. The method of claim 10 wherein said generating step comprises maintaining a memory for storing a length code corresponding to each possible frame length and retrieving from said memory the length code for each frame and inserting the length code into the frame.

12. The method of claim 11 wherein said generating step takes place at a fractional terminal equipment of an ISDN network, wherein said first transmission means is formed by a bus, and wherein said frames are transmitted over said first transmission means in an ISDN B channel to a fractional network terminator incorporating said adapter.

13. A method for transmitting data frames comprising the steps of generating frames comprising a delimiting flag, a length code following the flag, an address field, a control field, a variable length data field, and a frame check sequence, said length code not altering the frame check sequence of a frame, transmitting the frames via a first low bit rate transmission medium, receiving the frames at an adapter, and retransmitting the frames by the adapter out onto a second high bit rate transmission medium after removing the length code starting at a time determined in response to the length code for each frame such that the transmitting and retransmitting steps for each frame are completed substantially simultaneously.

* * * * *